Aug. 4, 1942.   H. C. VON BRAUN   2,291,934
VAPORIZER
Filed Sept. 23, 1941   2 Sheets-Sheet 1

Inventor
Henry Charles von Braun.

Attorneys.

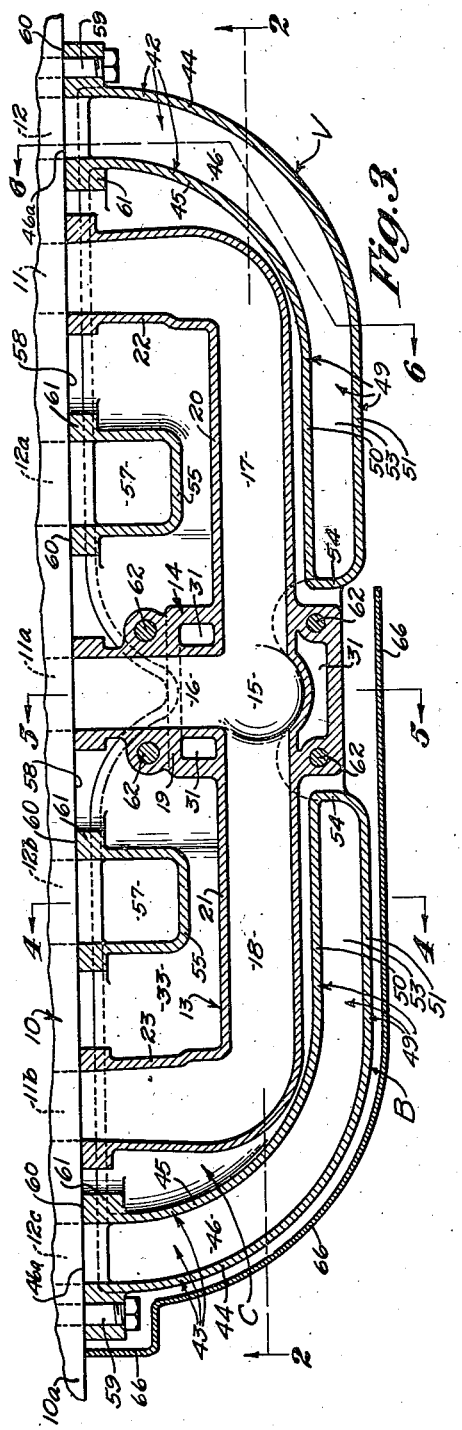

Patented Aug. 4, 1942

2,291,934

UNITED STATES PATENT OFFICE 2,291,934

VAPORIZER

Henry Charles von Braun, Redondo Beach, Calif., assignor of one-half to L. M. Harlow, Los Angeles, Calif.

Application September 23, 1941, Serial No. 411,965

15 Claims. (Cl. 123—122)

This invention has to do generally with vaporizers and is more particularly concerned with vaporizers for use in connection with internal combustion engines. It has particularly advantageous use in connection with engines of motor vehicles, though not at all limited to such use.

Generally, the invention is in the nature of an exhaust manifold so fashioned and adapted to be so associated with the intake manifold of an internal combustion engine, that the hot exhaust gases traversing the exhaust manifold are adapted to preheat the fuel mixture as they, in turn, traverse the intake manifold.

While the invention is used to great advantage in connection with the preheating of usual motor fuel such as gasoline—because the preheating thoroughly vaporizes the gasoline before it is admitted to the cylinders and thus insures complete combustion with the result of generating greater power, eliminating carbon deposits, quieting the motor, increasing mileage per gallon, etc.—it has the additional advantage of enabling the efficient use of relatively low grade and cheap distillates, either alone or in a mixture with gasoline or other high grade hydrocarbon fuel. The economical advantage of enabling the use of relatively inexpensive hydrocarbon fuels is obvious, and it is to be noted that the usual disadvantages of using such fuel are obviated when utilizing my device. That is, combustion is so complete that even when such low grade fuels are used, there is minimum deposit of carbon within the cylinders, and there is no dilution of crank case oil, as so often results from condensed and unconsumed fuel.

Attempts have heretofore been made to accomplish such results, but such attempts have not had full success because of the failure to recognize certain factors. For instance, it has not been recognized that a certain balance must be maintained—that is, it is as important to avoid too much heat as it is to supply sufficient heat. Certain attempts have involved the provision of a common housing placed about standard exhaust and inlet manifolds, the hot exhaust pipe heating the interior of the housing and thus, by radiation, heating the intake manifold and its contained fuel. This expedient fails to supply sufficient heat and fails properly to distribute such heat as is supplied. Other attempts have involved the use of a common wall for exhaust and intake manifolds, so the hot exhaust gases are in direct contact with a wall of the intake manifold. This not only presents the danger of burning through the intake manifold wall, but also tends to overheat the fuel mixture—such overheating, where it is applied unrestrictedly, reducing volumetric efficiency.

Other attempts failed to recognize the necessity of uniformly preheating the fuel mixture along substantially the entire extent of the intake manifold. Aggravating this condition of uneven heating is the fact that the manifold at the forward end of the cylinder block is exposed to the cooling effect of the fan blast.

Generally, it is the object of my invention to provide a vaporizer which eliminates the objectionable features spoken of above, and provides for substantially uniform heating of the fuel mixture from end to end of the intake manifold. The invention also insures that the amount of heating is neither too great nor too small, thus further contributing to the securement of the advantageous effects noted above as resulting from fully efficient preheating of the fuel mixture.

The invention involves the provision of an exhaust manifold which is, in effect, a hollow-walled box-like casing with the hollow walls defining the exhaust passageways. The box is then fitted, with clearance, around the intake manifold, the clearance space providing a chamber whose contained air is heated by the hollow walls of the exhaust manifold and transmits that heat to the intake manifold and its contained fuel mixture. The hot exhaust gases are, in the main, kept from direct contact with the intake manifold (thus avoiding overheating of the fuel mixture or burning through of the intake manifold) and yet the association of parts is such that the heating, by radiation, of the intake manifold is evenly distributed and is ample to insure complete vaporization of the fuel mixture.

The structure of the vaporizer is such that it may be applied to a motor without disturbing the standard intake manifold and, as has been said, it supplants the standard exhaust manifold rather than representing a part added to the usual exhaust manifold. The installation of the vaporizer may be accomplished with great ease and, when installed, does not represent an overly bulky attachment.

Other advantages and features of novelty will be made apparent in the following detailed description, reference being had to the accompanying drawings, in which:

Fig. 2 is an enlarged section on line 2—2 of

Figure 1:
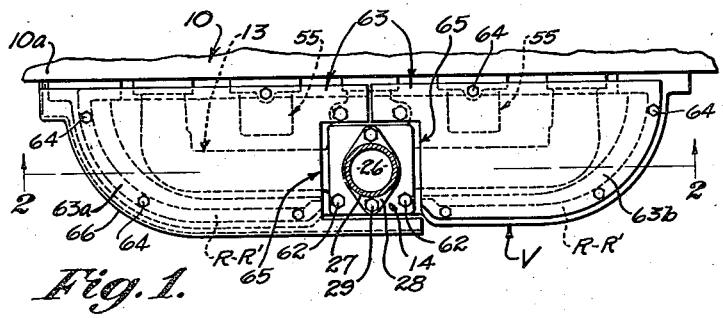
Fig. 1 is a top plan view of the device as applied to an engine block, the block being shown fragmentarily.
Figure 4:
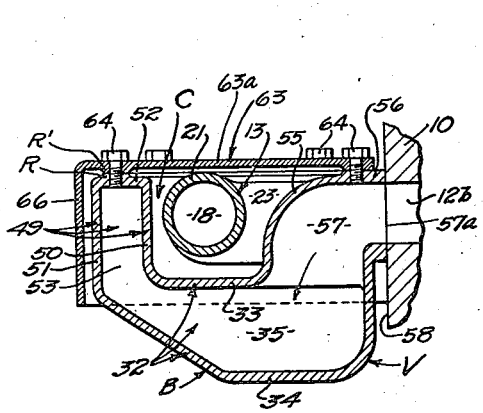
Figure 5:
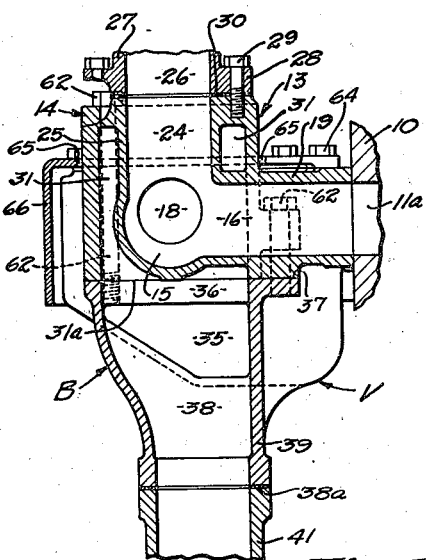
Figure 6:
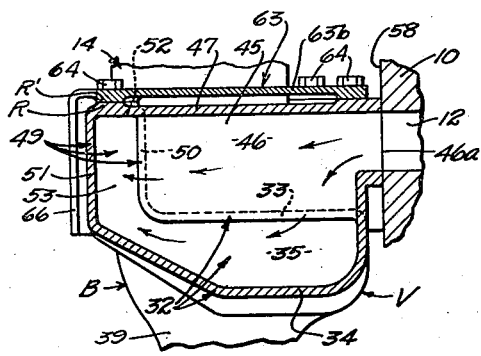

Fig. 1 or may be considered an equi-scale section on line 2—2 of Fig. 3;

Fig. 3 is a section taken on line 3—3 of Fig. 2;
Fig. 4 is a section taken on line 4—4 of Fig. 3;
Fig. 5 is a section on line 5—5 of Fig. 3; and
Fig. 6 is a section taken on line 6—6 of Fig. 3.

A usual internal combustion engine block, shown only fragmentarily at 10, has usual intake ports 11, 11a and 11b, the central intake port 11a serving the two middle cylinders (not indicated) as is usual in certain types of internal combustion engines, while usual exhaust ports are indicated at 12, 12a, 12b and 12c. The left-hand end 10a of block 10 will be assumed to be the leading end of the engine, that is, the end which is directly exposed to the blast of the cooling fan (not shown). Incidentally, while the vaporizer is shown installed on a six cylinder engine (the two inside exhaust ports and the three intake ports each servicing two cylinders) it will be understood this showing is in no way to be considered as limitative on the invention, for obviously the same principle may be applied irrespective of the number of cylinders or of intake and exhaust ports.

A standard intake manifold 13 includes a central or block portion 14 whose bore 15 is in communication with bores 16, 17 and 18 of extensions 19, 20 and 21, respectively. Main extensions 20 and 21 are angled to form branch extensions 22 and 23, respectively, thus putting bores 17 and 18 into communication with intake ports 11 and 11b, respectively, while bore 16 is in communication with intake port 11a. Likewise, extension 19 may be considered as a branch.

It is standard with only certain makes of engines that the intake manifold has the particular central or block portion here shown and it will be understood the showing of this particularity and the adaptation of part of my vaporizer thereto is not to be considered as limitative on the broader aspects of the invention. However, I will proceed to describe the illustrated manifold structure, as the device of my invention is particularly well adapted to association therewith and presents certain points of novelty in such association.

Central portion 14 has a vertical bore 24 extending through riser 25, bore 24 communicating at its lower end with bore 15 and at its upper end with bore 26 of fitting 27 which leads to the output side of a down-draft carbureter (not shown). Flange 28 of fitting 27 is bolted at 29 (Fig. 1) to the top 30 of the central portion 14, the latter being cored out at 31 around riser 25 and extension 19, with the corings opening to the under face 31a of the central portion, for a purpose to be described.

The vaporizer, which may also be broadly considered as including the exhaust manifold, is generally indicated at V. It embodies, generally speaking, a box-like device whose bottom, end walls, one full side wall and part of the other side wall, are hollow, with the hollows intercommunicating and also communicating with exhaust ports 12, 12a, 12b and 12c, the hollows thus serving as exhaust passageways. The vaporizer includes a body member B which is preferably a casting of any suitable metal. Bottom 32 of member B extends from end to end of the device and is made up of vertically spaced wall elements 33 and 34 defining a passageway 35, the element 34 inclining from its opposite ends towards the center so passageway 35 is of gradually increasing size as it approaches the center.

Wall element 33 has a central opening 36 which opens to the upper, flat surface 37 (Fig. 5) upon which the under face 31a of central portion 14 rests. Passageway 35, opening 36, and corings 31 are thus put into communication.

Passageway 35 opens centrally and downwardly at 38 through a flanged neck 39, the end 38a of passageway extension 38 representing the outlet port of the exhaust manifold, neck 39 being adapted to be coupled at 40 to exhaust pipe 41.

The hollow end walls 42, 43 of the box-like vaporizer structure are preferably, though not necessarily, arcuate as viewed in plan, and are each made up of horizontally spaced wall elements 44 and 45 defining between them the passageways 46, these passageways communicating, one each, with exhaust ports 12 and 12c. The ends 46a of passageways 46 may be considered inlet ports to the wall hollows. Wall elements 44 and 45 are connected at their upper ends by horizontal elements 47 which close off the upper ends of passageways 46, the lower ends of said passageways opening through curved paths 48 into exhaust passageway 35.

One side wall 49, which is spaced horizontally from block 10, is made up of horizontally spaced wall elements 50 and 51 connected across their tops by elements 52 (Fig. 4) to define a passageway 53, elements 52 and 47 being flush, and passageway 53 opening smoothly into both passageway 35 of bottom 32 (Figs. 4 and 6) and passageways 46 of end walls 43 (Fig. 3). In order to avoid interference with the central portion 14 of intake manifold 13, side wall 49 may be centrally interrupted as shown in Fig. 3, wall elements 54 closing the ends of passageway 53 at opposite sides of said central portion.

Preferably, though not necessarily, the end walls 43 are given a relatively slow curve, as shown in Fig. 3, so exhaust gases from ports 12 and 12c may flow evenly and without abrupt turn into passageways 53 and 35, with obvious advantage.

It will be seen that walls 42, 43 and 49 may be considered together as a continuous marginal vertical wall extending along one side and both ends of the horizontal wall 32.

Extending upwardly from element 33 of bottom 32 are elbows 55 whose tops 56 are in horizontal alinement with elements 52 and 47 and whose curved bores 57 are adapted to communicate, one each, with exhaust ports 12 and 12b, both bores 57 communicating with passageway 35 in bottom 32. The ends 57a of bores 57 may be considered inlet ports to passageway 35. The elbows may be considered as comprising hollow elements making up a part of one side of the box-like vaporizer structure, the side face 58 of block 10 completing said side.

When installing so much of the structure as has been thus far described, it is necessary first only to remove the standard exhaust manifold; leaving the standard intake manifold, with its central part 14 (when that part is also standard) in place. The vaporizer V is then lifted into place, as illustrated, from beneath the intake manifold, the intake manifold with its extensions 19, 22 and 23 thus occupying the heat-exchange chamber C defined by the engine block, elbows 55, bottom 32, ends 42, 43 and side 49. The standard exhaust manifold bolts 59 may be employed for drawing the machined faces 60 of bosses 61, provided about each of the vaporizer inlet ports, snugly against the engine block, while through-bolts 62 serve to tightly stantially vertically from one side and around the ends of the horizontal wall, the hollows of the walls being in communication, said walls defining, at least partially, a heat exchange chamber, and a hollow member extending substantially vertically from the other side of the horizontal wall and spaced from the ends thereof and further defining said chamber, the hollow of the member communicating with the wall hollows, there being inlet ports and an outlet port opening, respectively, to and from said hollows.

4. In a device of the character described, a body member having a substantially horizontal hollow wall, a second hollow wall extending substantially vertically from one side and around the ends of the horizontal wall, the hollows of the walls being in communication, said walls defining, at least partially, a heat exchange chamber, a hollow member extending substantially vertically from the other side of the horizontal wall and spaced from the ends thereof and further defining said chamber, the hollow of the member communicating with the wall hollows, there being inlet ports and an outlet port opening, respectively, to and from said hollows, and a cover connected to the tops of said walls and further defining the chamber.

5. In a device of the character described, a body member having a substantially horizontal hollow wall, a second hollow wall extending substantially vertically from one side and around the ends of the horizontal wall, the hollows of the walls being in communication, said walls defining, at least partially, a heat exchange chamber, a hollow member extending substantially vertically from the other side of the horizontal wall and spaced from the ends thereof and further defining said chamber, the hollow of the member communicating with the wall hollows, there being inlet ports and an outlet port opening, respectively, to and from said hollows, and a cover connected to the tops of said walls and said hollow member and further defining the chamber.

6. In a device of the character described, a body member having a substantially horizontal hollow wall, a second hollow wall extending substantially vertically from one side of the horizontal wall, the hollows of the walls being in communication, said walls defining, at least partially, a heat exchange chamber, and a plurality of hollow members extending substantially vertically from the other side of the horizontal wall, said hollow members being spaced from each other and from the ends of the horizontal wall and further defining said chamber, the hollows of the members communicating with the wall hollows, there being inlet ports opening to the hollows of said walls and said hollow members and there being an outlet port opening from the hollow of one of the walls.

7. In combination with an internal combustion engine having intake and exhaust ports and an intake manifold connecting the intake ports, a vaporizer embodying a body member having a hollow horizontal wall arranged beneath the intake manifold, and a hollow vertical wall arranged in front of said intake manifold, the hollows of the wall being intercommunicating and being in communication with the exhaust ports of the engine, there being an outlet port opening from the hollow of one of the walls.

8. In combination with an internal combustion engine having intake and exhaust ports and in an intake manifold connecting the intake ports, a vaporizer embodying a body member having a hollow horizontal wall arranged beneath the intake manifold, and a hollow vertical wall arranged in front of said intake manifold, the hollows of the wall being intercommunicating and being in communication with the exhaust ports of the engine, there being an outlet port opening from the hollow of one of the walls, and a cover attached to the body member and overlying the intake manifold.

9. In combination with an internal combustion engine having intake and exhaust ports and an intake manifold connecting the intake ports, a vaporizer embodying a body member having a hollow horizontal wall arranged beneath the intake manifold, and a hollow vertical wall arranged in front of said intake manifold, the hollows of the wall being intercommunicating and being in communication with the exhaust ports of the engine, there being an outlet port opening from the hollow of the horizontal wall.

10. In combination with an internal combustion engine having intake and exhaust ports and an intake manifold connecting the intake ports, the main extension of the intake manifold being spaced horizontally from the engine and having spaced branch extensions leading to the intake ports; a vaporizer embodying a body member having a hollow horizontal wall extending beneath the intake manifold, a hollow vertical wall arranged in front of the intake manifold, and vertical hollow members extending upwardly between said branch extensions of the intake manifold, the hollows of the walls and hollow members being in communication with one another and with the exhaust ports of the engine, and there being an outlet port opening from the hollow of one of the walls.

11. In combination with an internal combustion engine having intake and exhaust ports and an intake manifold connecting the intake ports, the main extension of the intake manifold being spaced horizontally from the engine and having spaced branch extensions leading to the intake ports; a vaporizer embodying a body member having a hollow horizontal wall extending beneath the intake manifold, a hollow vertical wall arranged in front and around the ends of the intake manifold, and vertical hollow members extending upwardly between said branch extensions of the intake manifold, the hollows of the walls and hollow members being in communication with one another and with the exhaust ports of the engine, and there being an outlet port opening from the hollow of one of the walls.

12. In combination with an internal combustion engine having intake and exhaust ports and an intake manifold connecting the intake ports, the main extension of the intake manifold being spaced horizontally from the engine and having spaced branch extensions leading to the intake ports; a vaporizer embodying a body member having a hollow horizontal wall extending beneath the intake manifold, a hollow vertical wall arranged in front and around the ends of the intake manifold, and vertical hollow members extending upwardly between said branch extensions of the intake manifold, the hollows of the walls and hollow members being in communication with one another and with the exhaust ports of the engine, and there being an outlet port opening from the hollow of one of the walls, and a cover connected to the body member and extending over the top of the intake manifold.

clamp face 37 (Fig. 5) of bottom element 33 against face 31a of the central portion 14 of intake manifold 13.

With so much of the device installed, a cover plate 63, preferably made up of two sections 63a and 63b, is bolted at 64 to elements 47, 52 and elbows 55, said elements and cover plate preferably having engaged ridges R and R', respectively, which space the cover plate slightly above the remaining horizontal extents of said elements. Cover plate 63 serves to define the top of chamber C. The plate sections are cut away at 65 (Fig. 1) to accommodate central portion 14 of the intake manifold. Preferably, plate section 63a, which is at the leading end 10a of block 10, is provided with a depending apron 66, preferably spaced somewhat from end-wall and side-wall elements 44 and 51, respectively, which serves as a shield to prevent air blasts from the cooling fan, or from the rapid advance of the car through the surrounding air, from having harmful chilling or cooling effect on the hot exhaust gases at the leading end of the vaporizer and hence from relatively cooling the air at the leading end of chamber C. The heat generated in chamber C by radiation from the exhaust manifold, is thus held substantially uniform from end to end of the vaporizer and is capable of heating the intake manifold and its contained fuel mixture substantially uniformly from end to end—a feature of obvious advantage, particularly since it is known that the forward cylinders are normally the least efficient because the mixture fed thereto is usually much cooler than that fed to the others, and the described structure prevents such localized cooling.

It will be obvious that the order of assembly may be varied to suit given standard equipment and it is also to be noted that specific relative positions such as "top" and "bottom" are set forth merely to orient the parts and, when set forth in the claims, are not to be considered as limitative.

With the device installed as illustrated and described, it will be seen that exhaust gases from ports 12, 12a, 12b and 12c will flow smoothly through elbows 55 and the hollow end, bottom and side walls of the vaporizer and finally out through exhaust pipe 41. The hollow walls of the vaporizer have large volumetric capacity and there is an absence of restrictions throughout the exhaust passageways so the gases can flow quickly and uninterruptedly from the exhaust ports into said walls. The exhaust gases are thus taken care of efficiently and without building up harmful back pressures.

The air within chamber C becomes heated by the hot hollow walls of the vaporizer and, in turn, the hot air heats the intake manifolds substantially evenly from end to end, so the fuel mixture passing horizontally through the intake manifold extensions 19, 22 and 23 is evenly heated and thoroughly vaporized before it is delivered to intake ports 11, 11a and 11b.

It will be seen that the intake and exhaust manifolds are so relatively nested that all parts of the intake manifold are quite closely adjacent one or more of the hot, hollow walls of the vaporizer. Further, there are three hollow vaporizer walls (counting elbows 55 each as a hollow wall) about each part of the intake manifold. Thus, although the hot exhaust gases are not in direct contact with the intake manifold, their heat is efficiently transmitted through the intervening chamber air to all parts of the intake manifold and its contained fuel mixture. It will be realized also that the portions of the engine block which are exposed to the interior of, and thus partially define, chamber C, contribute to the heating of chamber air and thus, ultimately, to the heating of the fuel mixture.

The heating of the fuel mixture as described, thoroughly and completely vaporizes it, thus bringing about all the advantageous ends spoken of at the forepart of the specification. As stated there, it promotes full and complete combustion whether the hydrocarbon fuel be of relatively high or low grade and thus smooths out the power delivery, gives greater power with increased mileage per gallon, practically eliminates carbon deposits and crank case oil dilution, and generally greatly increases the efficiency of the engine.

Where the standard intake manifold has the described cored out central portion 14, it will be seen that corings 31 communicate through opening 36 directly with the exhaust passageway 35 (Figs. 2 and 5) so that the hot exhaust gases may have direct contact with the central portion of the intake manifold and give increased localized heat at this particular point where the fuel mixture first reaches the intake manifold from the carbureter. This is found of advantage in certain instances, but it will be understood the invention, considered in its broader aspects, is not limited to this feature of localized direct heating.

As has been said, the flow of the exhaust gases through the various vaporizer passageways is, because of the illustrated and described contours and inter-connections of said passageways, smooth and even and is accomplished without building up harmful back pressures. In fact, the vaporizer is a very efficient exhaust manifold in itself and hence the advantages of its vaporizing function are gained without in any way losing exhaust efficiency.

While I have illustrated and described a preferred form of my invention, it is to be understood various changes in design, structure and arrangement may be made without departing from the spirit and scope of the appended claims.

I claim:

1. In a device of the character described, a body member having a substantially horizontally extending wall, and a joining, substantially vertically extending wall, said walls defining, at least partially, a heat exchange chamber, there being a hollow in at least one of said walls, there being an inlet port and an outlet port opening, respectively, to and from said hollow, and a cover connected to one of said walls and further defining said chamber.

2. In a device of the character described, a body member having a substantially horizontal hollow wall, a second hollow wall extending substantially vertically from one side of the horizontal wall, the hollows of the walls being in communication, said walls defining, at least partially, a heat exchange chamber, and a hollow member extending substantially vertically from the other side of the horizontal wall and spaced from the ends thereof and further defining said chamber, the hollow of the member communicating with the wall hollows, there being inlet ports and an outlet port opening, respectively, to and from said hollows.

3. In a device of the character described, a body member having a substantially horizontal hollow wall, a second hollow wall extending sub- 13. In a device of the character described, a body member having a wall which defines, at least partially, a heat exchange chamber, there being a hollow within said wall, there being an inlet port and an outlet port opening, respectively, to and from said hollow, and a cover connected to said body member and further defining said chamber, and a depending apron at one end of said cover and extending downwardly along but in horizontally spaced relation to the vertical wall.

14. In a device of the character described, a body member having a wall which defines, at least partially, a heat exchange chamber, there being a hollow within said wall, there being an inlet port and an outlet port opening, respectively, to and from said hollow, and a cover connected to said body member and further defining said chamber, and a depending apron at one end of said cover and extending downwardly along but in horizontally spaced relation to the vertical wall at one end of the body member.

15. In a device of the character described, a body member having a substantially horizontally extending wall, and a joining, substantially vertically extending wall, said walls defining, at least partially, a heat exchange chamber, there being a hollow in at least one of said walls, and there being an inlet port and an outlet port opening, respectively, to and from said hollow, and a vertical apron secured to the body member and extending downwardly along but in horizontally spaced relation to the vertical wall.

HENRY CHARLES von BRAUN.